P. O. KEILHOLTZ & F. E. RICKETTS.
VOLTAGE COMPENSATING AND REGULATING MEANS.
APPLICATION FILED DEC. 26, 1908.

1,041,482.

Patented Oct. 15, 1912.

6 SHEETS—SHEET 1.

P. O. KEILHOLTZ & F. E. RICKETTS.
VOLTAGE COMPENSATING AND REGULATING MEANS.
APPLICATION FILED DEC. 26, 1908.
1,041,482.
Patented Oct. 15, 1912.
6 SHEETS—SHEET 2.
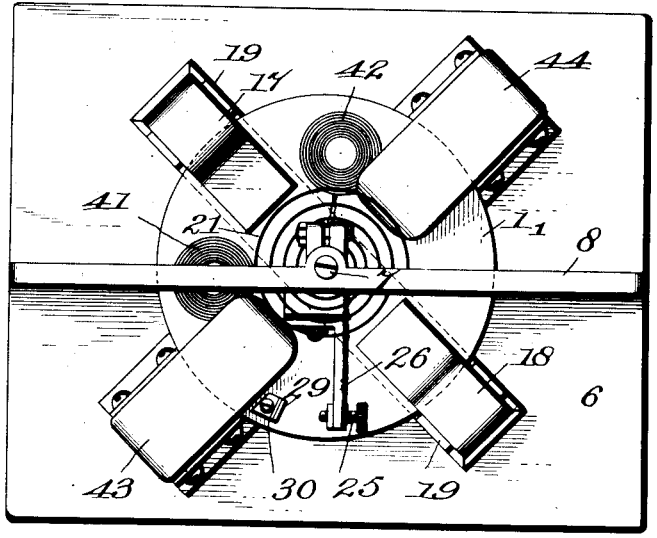
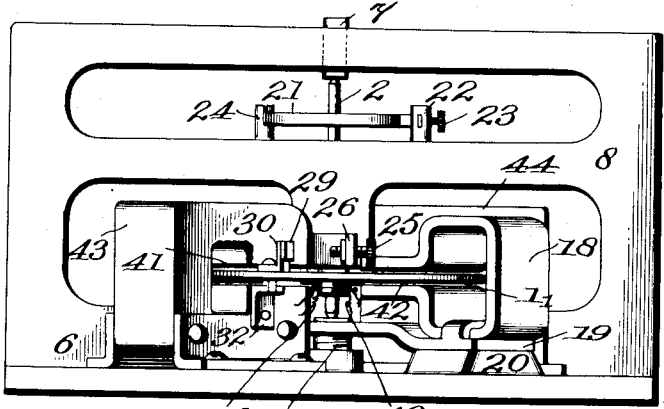
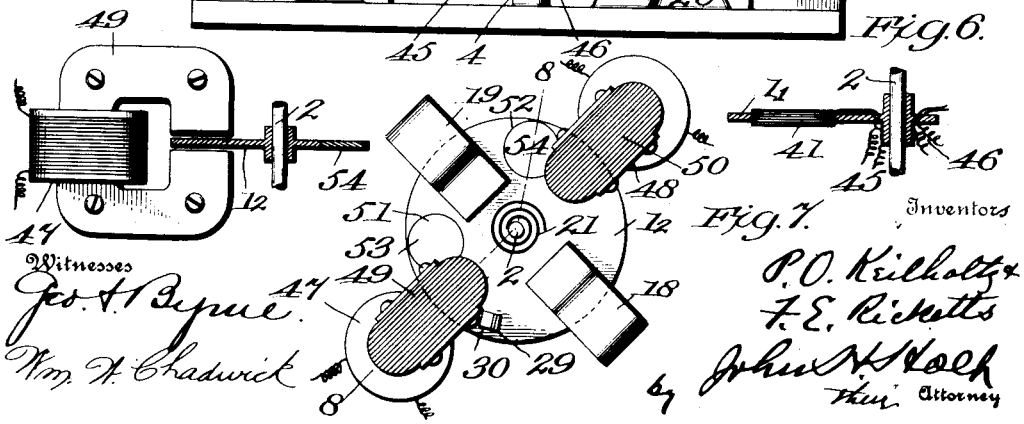

P. O. KEILHOLTZ & F. E. RICKETTS.
VOLTAGE COMPENSATING AND REGULATING MEANS.
APPLICATION FILED DEC. 26, 1908.
1,041,482.
Patented Oct. 15, 1912.
6 SHEETS—SHEET 5.
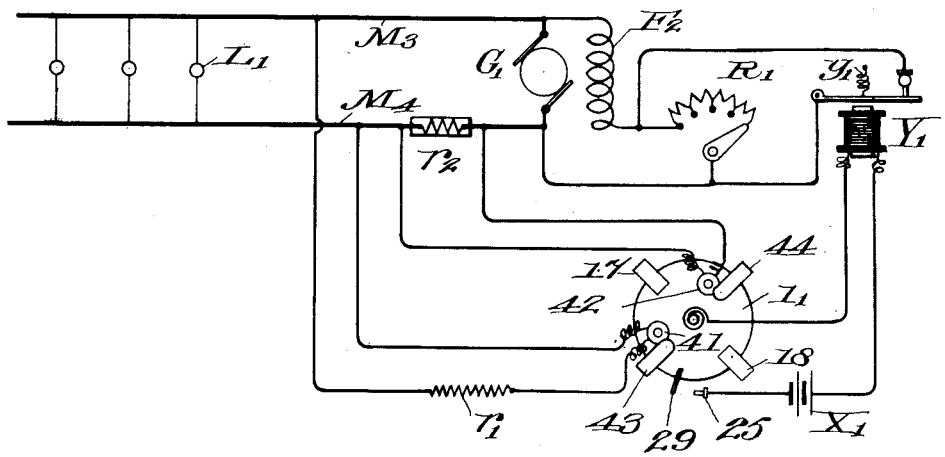
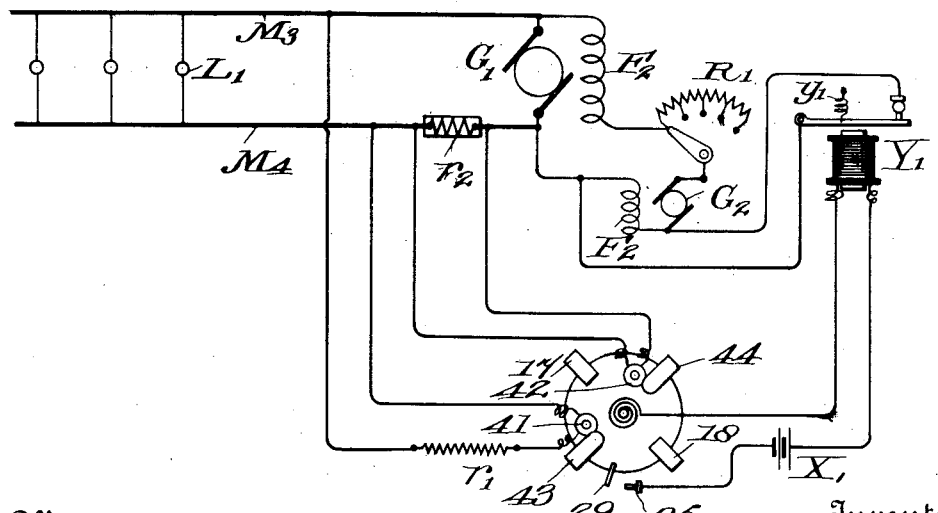

P. O. KEILHOLTZ & F. E. RICKETTS.
VOLTAGE COMPENSATING AND REGULATING MEANS.
APPLICATION FILED DEC. 26, 1908.
1,041,482.
Patented Oct. 15, 1912.
6 SHEETS—SHEET 6.
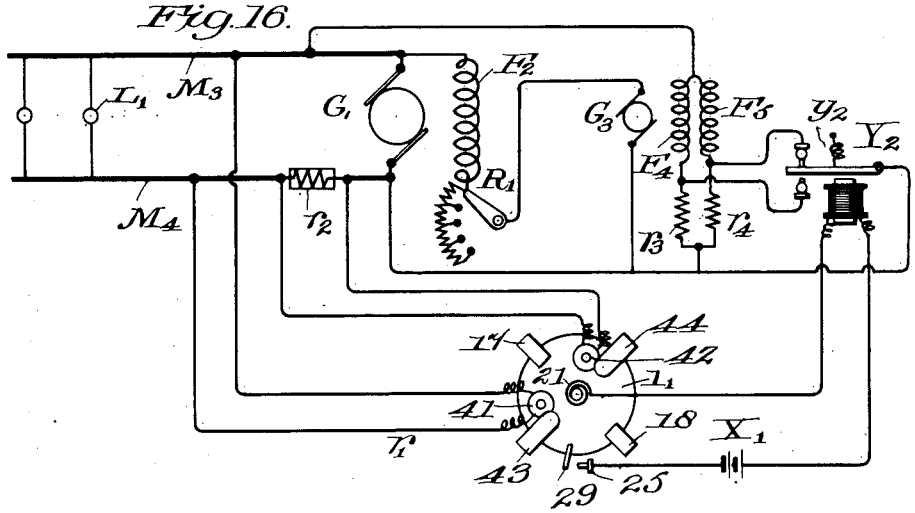
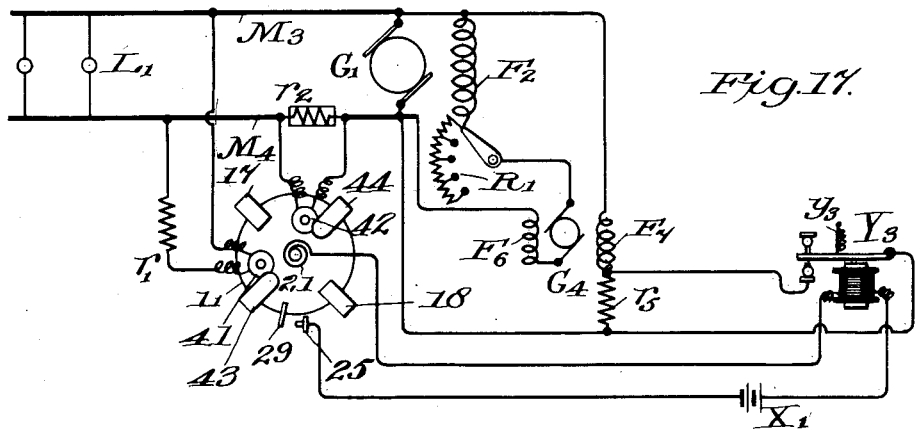
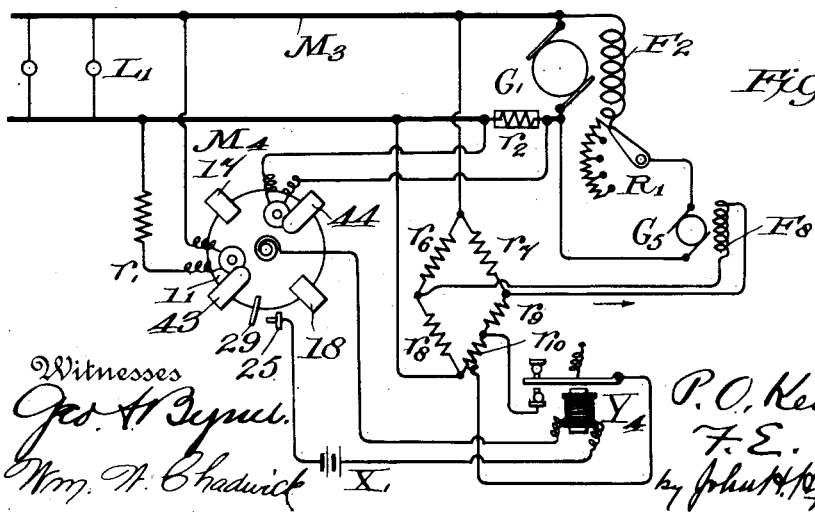

UNITED STATES PATENT OFFICE.

PIERRE O. KEILHOLTZ AND FORREST E. RICKETTS, OF BALTIMORE, MARYLAND.

VOLTAGE COMPENSATING AND REGULATING MEANS.

1,041,482.  Specification of Letters Patent.  Patented Oct. 15, 1912.

Application filed December 26, 1908. Serial No. 469,342.

*To all whom it may concern:*

Be it known that we, PIERRE O. KEILHOLTZ and FORREST E. RICKETTS, citizens of the United States, residing at Baltimore, in the State of Maryland, have invented certain new and useful Improvements in Voltage Compensating and Regulating Means, of which the following is a specification.

The primary object of this invention is to provide accurate and reliable means for maintaining a constant voltage, or a constant compensated voltage, at the generator, or at some other point in an electric system, and in carrying out this object we provide a device, forming one of the elements of our system of regulation, which overcomes many of the fundamental objections which may be urged against other devices used in an analogous connection. This device consists of a novel form of controlling relay and is characterized by a small time element which is secured by the small mass and moment of inertia of its moving parts; the reduction of friction to a minimum; its dead beat quality which is obtained without friction; its correct interpretation of the current and voltage relation in an electric system, and its compensating feature, all of which will be more readily understood from the following description.

Our invention also embraces a compensating voltmeter which may be constructed as hereinafter pointed out, or in any other suitable manner.

Our invention comprises other novel features hereinafter more fully described and particularly pointed out in the accompanying claim.

In order to more fully describe our said invention reference will be had to the accompanying drawings wherein:—

Figure 1:
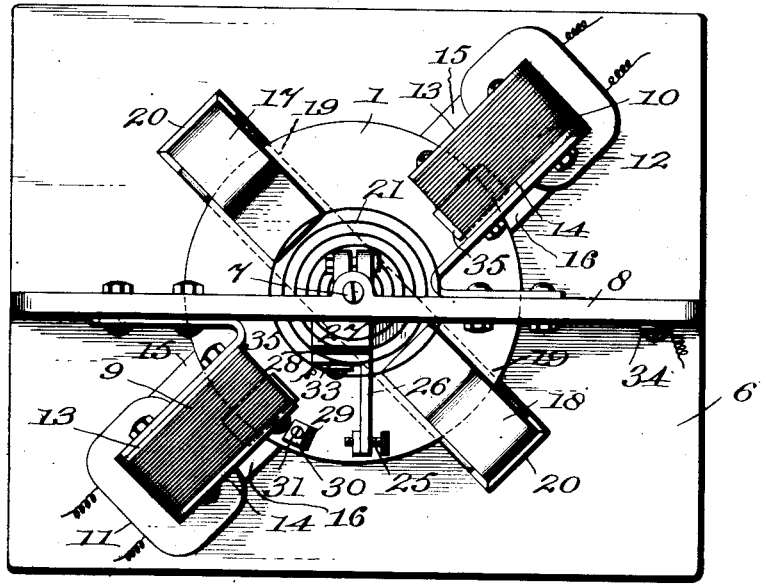
Figure 2:
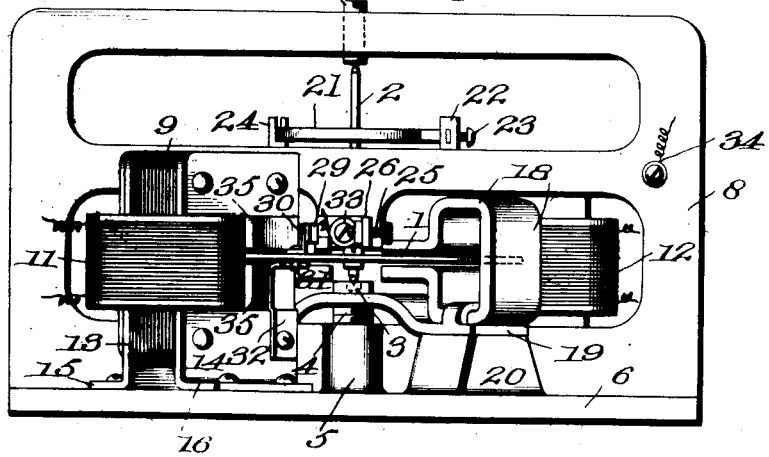
Figure 3:
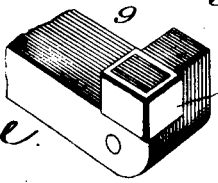

Figure 1, is a top plan view of a form of said relay designed for use with alternating currents; Fig. 2, a front elevation of the same; Fig. 3, a fragmentary detail perspective view of a portion of one of the magnets showing the short circuiting ring for causing magnetic lag in a portion of magnet; Fig. 4, a top plan view of a form of said relay designed for use with a direct current; Fig. 5, a front elevation of the relay shown in Fig. 4; Fig. 6, a detail fragmentary section through the rotating disk of the relay shown in Figs. 4 and 5; Fig. 7, a top plan view of a form of said relay designed for use either with an alternating current or a direct current; Fig. 8, a section through the rotating disk of the relay shown in Fig. 7, said section being taken on line 8—8 in said figure and showing one of the electromagnets in side elevation, Figs. 9, 10, 11, 12 and 13, are diagrams showing the said relay in one form or another in connection with various arrangements of circuits and apparatus for effecting voltage regulation as applied to alternating currents, and Figs. 14, 15, 16, 17 and 18, are diagrams showing a form of said relay in connection with various arrangements of circuits and apparatus for effecting voltage regulation as applied to direct current systems.

The form of our relay shown in Figs. 1 to 3, inclusive, comprises, among other parts, a thin disk 1 of light non-magnetic metal, preferably aluminum, mounted fast on a shaft 2, which rests at its lower end upon a jewel bearing 3, mounted in an adjustable plug 4, screwed into a lug 5, on the base 6 of the instrument. The upper end of the shaft 2 is steadied in a suitable bearing in the end of an adjustable plug 7, screwed into an upright frame 8, forming a part of a casting of which the base 6 forms the other part. This disk 1 is adapted to rotate to a limited extent between the pole faces of two separate electromagnets comprising laminated field pieces 9 and 10 respectively, arranged to be excited by coils 11 and 12. The laminated fields of these magnets are clamped between brass or other non-magnetic plates 13, 14, flanged as at 15, 16, and then bolted to the base of the instrument. These magnets are arranged on diametrically opposite sides of the axis of said disk, as shown, and may be supported in any other suitable manner. The disk 1 also rotates in the fields of two permanent damping magnets 17 and 18 located, in the case shown, on diametrically opposite sides of the axis of said disk and 90° from the electromagnets. These damping magnets, however, may occupy different relative positions from that shown, and, of course, may be supported or made fast to the base of the instrument in any suitable way. In the drawings we have shown them clamped to a brass or other suitable plate 19 secured fast to lugs 20 cast on the base of the instrument. The strength of these damping magnets is sufficient only to prevent oscillation of the disk, which is their sole function. These dampers by converting the work done by the natural forces in the device into heat instead of into stored energy of vibration cause the device to respond to those forces alone which are indicative of the electrical conditions to be dealt with and not to the natural ones of the device itself.

The disk 1 tends to rotate against the torsional force of a coil spring 21 made fast at one end to the shaft 2 and passing at its outer end through a post 22, on the frame 8, provided with a set screw 23, by which the tension of the spring may be adjusted. This arrangement, however, is only one of many ways of mounting and adjusting this spring which we may employ. The lug 24 merely forms a rest for the outer convolution of the spring.

The stationary contact of the relay consists, in the present case, of a metal screw 25 threaded in the end of a rigid arm 26, of suitable conducting material, made fast to a lug 27 on the upright frame of the instrument, and insulated therefrom as at 28.

The movable contact consists of a small piece of platinum, or silver, or other suitable material 29, fixed to a thin strip of copper, or other suitable metal 30 made fast to the disk 1, as by a screw 31 which passes through the disk, and by so doing forms a stop which engages a fixed plate 32 and thus limits the rotation of the disk in one direction. Current may be led to and away from said contacts by terminals 33 and 34, one secured to the metal arm carrying the stationary relay contact, and the other to the frame of the instrument which is in permanent electrical connection with the movable contact 29 through the disk 1 and its shaft.

On each pole piece of each magnet is fitted a copper ring 35, which embraces a portion of each pole piece as shown. The object of these copper rings is to form a time lag in the magnetization and thereby produce a shifting field, the ultimate effect of which is to rotate the disk 1. The magnets 9 and 10 are so placed with relation to the disk 1 that a line drawn from the center of the embraced portion of a pole face to the non-embraced portion thereof is at right angles to the radius of the disk. The coercive force of the magnet thus tends to rotate the disk toward the embraced pole. Therefore, if the short circuiting rings on the two electro-magnets embrace directly opposite portions of the respective magnets, as shown in Fig. 1, or, in other words, if the relation of the rings to the unembraced portion of the poles of one magnet is such as to tend to cause a clockwise movement of the disk, and the position of the rings of the other magnet such as to tend to produce an anti-clockwise rotation of the said disk, as in the case of the magnets 9 and 10 respectively, Fig. 1, the effective force is differential, and is the resultant of the two magnetizations. If, however, the short circuiting rings are placed so that each magnet will tend to rotate the disk in the same direction, the resultant is cumulative, as is obvious.

Another way of producing substantially the same effect is by making the portion of the field pieces corresponding to that embraced by the rings 35 of different permeability from the other portions of the field. These, however, are well known ways of producing a time lag in magnetization and are not herein claimed as new.

Figure 9:
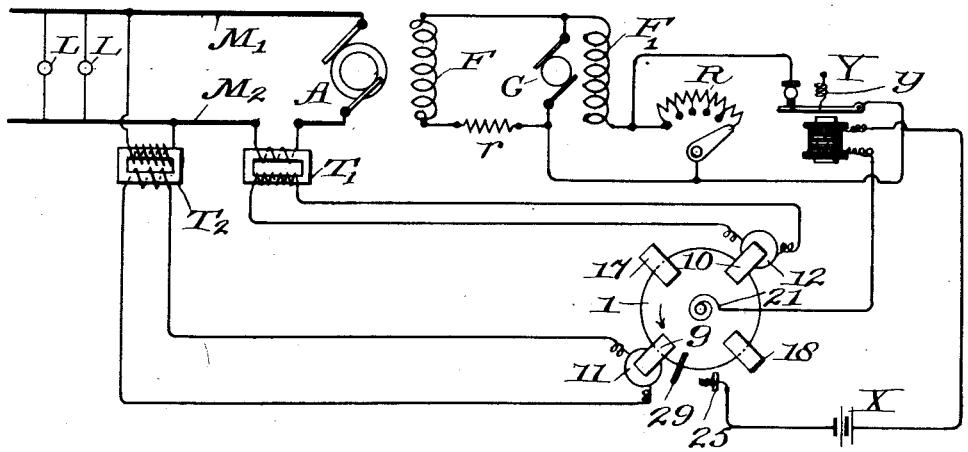

The theory and operation of this relay will be better understood by a reference to Fig. 9, which shows it as used as a part of a system for regulating the voltage on a single phase alternating current circuit, where A represents a single phase alternator supplying power through suitable mains $M_1$, $M_2$ to load L; F, the field of said alternator; G, an exciter connected to excite said field; $r$, a resistance in series between said field and one terminal of said exciter; R, a regulating rheostat in circuit with the shunt field $F_1$ of said exciter, and Y, a relay having its tongue and forward contact connected to make and break a shunt circuit around the rheostat R. The fixed and movable contacts 25 and 29 of our improved relay are connected in a circuit which includes the coil of the magnet of the relay Y, and a battery X, or other suitable source of current. The relay magnet coil 12 is connected through a suitable transformer $T_1$, in series with one of the mains of the supply circuit of the alternator, while the relay magnet coil 11 is connected through a suitable transformer $T_2$, in multiple with said supply mains. The magnet excited by coil 11 will therefore be responsive to the voltage of the line and the magnet excited by coil 12 to the current.

The operation is as follows: When the voltage of the line is applied to coil 11, the disk 1 will tend to rotate in the direction of the arrow and the tension of spring 21 is so adjusted that for a given voltage its force of retardation will balance the force of rotation due to the magnet excited by the voltage coil 11, and any increase in the voltage will cause the disk to rotate sufficiently to bring the contacts 29 and 25 into engagement and thus complete the exciting circuit of relay Y. The effect of closing this relay circuit is to cause the relay Y to draw its tongue away from its forward contact and thus break the short circuit around the regulating rheostat R, which causes a decrease in the excitation of the alternator field and a consequent lowering of the voltage of circuit $M_1$, $M_2$. When this voltage has decreased sufficiently, the force of the spring 21 will overcome the coercive force of the magnet of coil 11 and the disk will rotate in an opposite direction severing contacts 29, 25, and thus breaking the exciting circuit of relay Y. This done, the tongue of relay Y will be pulled by spring $y$ against its forward stop, thus again short circuiting the regulating rheostat R, and thereby increasing the excitation of the alternator, which causes it to again raise the voltage.

The device is made compensating by the magnet excited by coil 12. When current from the line is applied to this coil, its magnet assists the spring 21. Consequently a higher voltage is carried than were the voltage coil only employed, thus compensating for the drop of voltage on the line.

The coercive force of the magnet 10 may be varied by varying the number of turns of the coil 12, or by shifting the said magnet 10 radially, or rotating it about the center of its pole face, thereby varying the amount of compensation.

When current passes through the coil 12, magnet 10 will tend to rotate the disk 1 anti-clockwise, and when voltage is applied to the coil 11, magnet 9 will tend to rotate the disk clockwise. The resultant coercive force, therefore, is the resultant of two separate magnetizations, and the disk acts to effect the composition and resolution of these.

It is well known that the current element in an alternating current system is made up of two portions, one in phase with the voltage and the other out of phase with the voltage. If the voltage is compensated for the current in phase with the voltage, this compensation will hold only for that power factor or for that particular ratio of energy and inductive components. Therefore, if the power factor should change, as for example, from a day motor load to a night load of incandescent lamps, the compensation will also change, and an adjustment which is satisfactory during the day time becomes unsatisfactory at night. Moreover, as the current whether it is in phase or out of phase causes a drop in voltage in overcoming the resistance of the conductors, the whole current and not only the portion in phase with the voltage should correct.

If the power factor of a system be unity, or if the system be a direct current one, then the voltage and the whole of the current are in phase and in such a case a single magnet acting on the disk and excited by two coils, one a voltage coil and the other a current coil, as in the form of our invention herein described, the resultant magnetization produced by the excitation of said coils correctly interprets the voltage and current relations and the compensation is correct. This, however, is a special case.

The device which gives the general solution is the one wherein the two separate magnets acting on the one disk are employed and in which the resultant coercive force is due to the resultant of the two magnetizations. Such an arrangement corrects for the whole current and whole voltage whether in phase or out.

By substituting for the movable and fixed relay contacts 25, 29, a pointer and scale, our improved device may be used as a compensated indicating voltmeter.

Figure 10:
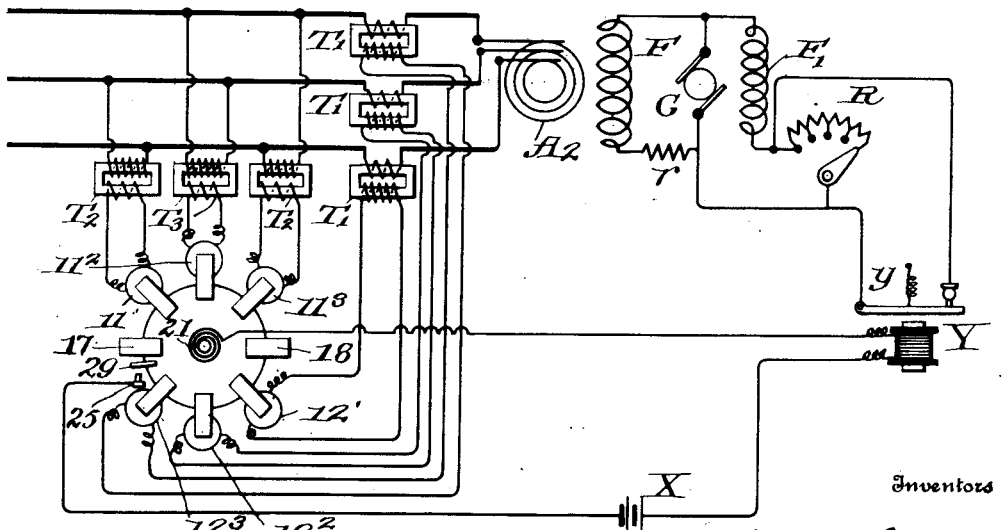

In Fig. 10, is shown our relay applied to a polyphase alternating current system. The arrangement and operation here is identical with that in Fig. 9, except that a voltage and a current excited magnet is provided for each phase. Such an arrangement will maintain an average compensated or average constant voltage.

The arrangements described with reference to Figs. 9 and 10 will compensate the voltage for a loss of voltage on the line; but by turning the magnetic circuit embraced by the series coil through 180°, so that the direction of its coercive force will be reversed, the voltage may be lowered instead of raised with increase in load.

As before pointed out, where the power factor is unity, or for a non-inductive load on an alternating current system, true compensation and regulation may be had by employing but one magnet to rotate the disk of our relay. Three specific arrangements for effecting regulation in such a case are shown diagrammatically in Figs. 11, 12 and 13.

Figure 11:
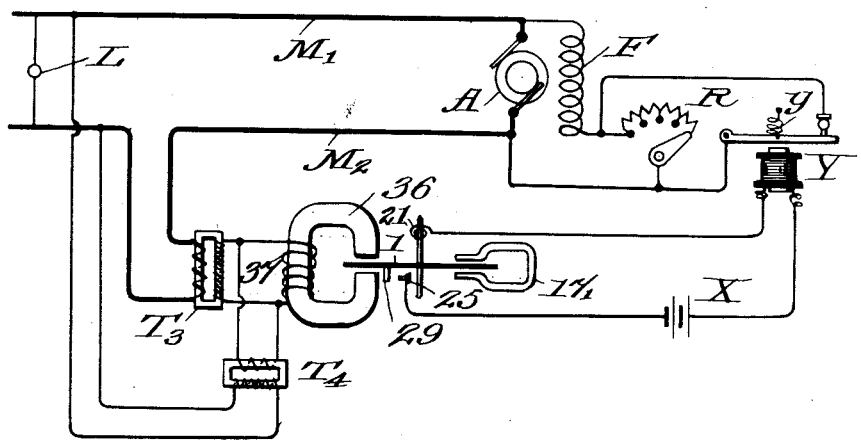

Reference will first be had to Fig. 11. In this case a single magnet 36 is employed in place of the two magnets in the former arrangements, and a single damper magnet $17_1$, diametrically opposite said magnet 36. This magnet 36 may be in every respect similar to the magnets 9 and 10, but its exciting coil 37 is connected both in series and in multiple with the line, as shown, through transformers $T_3$ and $T_4$, or otherwise. The operation of this arrangement is identical with that of Fig. 9, except that the disk 1 is rotated clockwise by the resultant magnetization produced by the voltage and current effects in the single coil instead of by two separate magnetizations as in Fig. 9.

Figure 12:
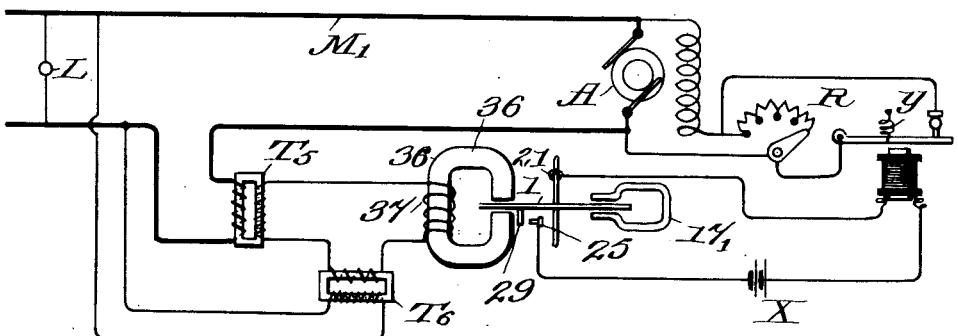

Fig. 12 simply shows another way of connecting the coil of magnet 36 to the line. Here the coil 37 is shown connected in series relation to both the current and voltage elements of the circuit as through transformers $T_5$ and $T_6$. The other connections may be the same as shown in Fig. 11.

Figure 13:
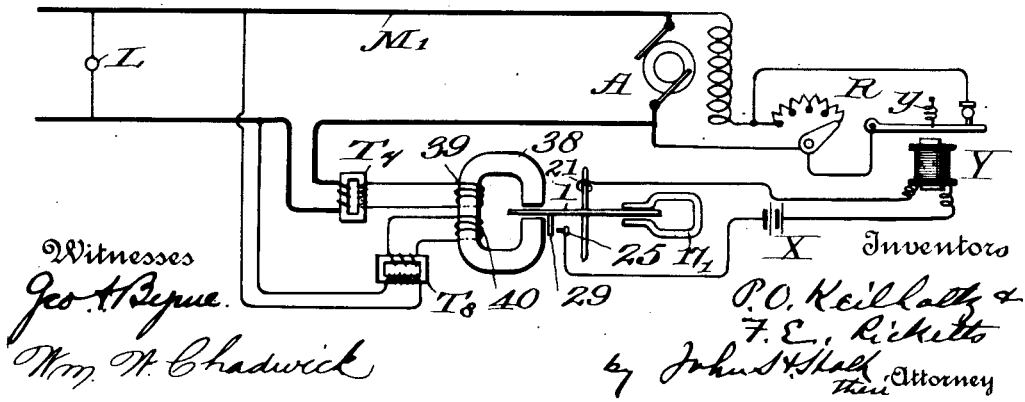

In Fig. 13 is shown an arrangement wherein the disk rotating magnet 38 is excited by the two coils 39 and 40 connected to the voltage and current elements respectively of the main line as through transformers $T_7$ and $T_8$. The other connections of the apparatus shown in Fig. 13 may be the same as in Fig. 11.

In Figs. 11 and 12, the disk 1 of the relay is caused to rotate by the magnetization of the magnet 36 which is produced by the resultant current in coil 37 composed of two currents, one from the current element $T_3$ and the other from the voltage element $T_4$. If these are exactly in phase, then the resultant current is the algebraic sum of the two, and if they are out of phase the resultant current is less and is equal to the algebraic sum of the resolved portions. The operation of the relay in Fig. 13 is different from that described with relation to Figs. 11 and 12. In the arrangement shown in Fig. 13, the disk 1 is acted upon by a force which is caused by the resultant magnetization produced by the two magnetizations, one by the current coil 39 and the other by the voltage coil 40. The effect upon the disk, however, is the same as in Figs. 11 and 12.

The arrangements illustrated in Figs. 11, 12 and 13 compensate the voltage for a loss of voltage on the line, but by reversing the series connections of the exciting coil of said magnets 37 and 38, the current element may be made to act with the voltage element, thereby causing the voltage to be lowered instead of raised with the increase in load.

In Figs. 4, 5 and 6, we have shown a form of our relay which is especially adapted for use with direct currents. This relay is substantially the same as the relay shown in Figs. 1 and 2 except that the disk of the former instrument is supplanted by a disk $1_1$ which is similar to the former disk in every respect but that it carries two coils 41 and 42 mounted in two openings therein, as shown most clearly in Fig. 6, and also in that the electromagnets of that relay are replaced by permanent magnets 43 and 44.

The coils 41 and 42 are independent, and current may be led to and from them through fine wire leads 45 and 46, two leads to each coil, as shown in Fig. 6, or in any other suitable way. The coils 41 and 42 are placed on the disk as shown, or in any other suitable positions on said disk to be within the influence of the respective magnets between whose pole faces they are adapted to pass, and the current is led into the coils in such manner that their coercive force tending to rotate the disk may be either cumulative or differential. Thus, if the current be passed through coil 41 in a direction to make the disk rotate clockwise and through the coil 42 to make it rotate anti-clockwise, then the coercive force will be differential, whereas if the current be passed through both coils in a direction to cause them to act to rotate the disk in the same direction, the coercive force will be cumulative.

The other parts of the relay correspond to parts similarly numbered in Figs. 1 and 2.

A form of our relay which dispenses with the movable coils and the consequent necessity for some means for leading current to and away from said coils when the device is used with direct currents, and which also may be used with either direct or alternating currents, is shown in Figs. 7 and 8. In this form of the instrument, we employ two electromagnets 47 and 48 having laminated fields 49 and 50 respectively located on diametrically opposite sides of the disk $1_2$, which is mounted in the same way as disks 1 and $1_1$, for rotation between the pole faces of said magnets. The pole pieces of these magnets, however, are not embraced with short circuiting rings as in the form shown in Figs. 1 and 2. The disk $1_2$ has two holes 51 and 52 stamped in it and in these holes are fitted respectively two magnetic metal (preferably soft iron) disks 53 and 54, the said disks being preferably flush with the lower and upper faces of the disk $1_2$, which latter, as in the former devices, is of some light non-magnetic metal, preferably aluminum. The magnetic disks 53 and 54 lie in the same half of the disk $1_2$ and may occupy positions relative to the pole pieces for a given position of the disk $1_2$ as shown.

The magnet 47 is energized by the current element and the magnet 48 by the voltage element. When the two magnets are thus energized, each will exert an attracting force on the magnetic disk adjacent and the coercive forces which rotate the disk are resolved as described with reference to Figs. 1 and 2. In this form of the instrument, the disk $1_2$ with its magnetic disks and the magnet 47 and 48 simply replace the disks and magnets in the other forms of the instrument; the mounting of the disk, the coil spring 21, the base 6, frame 8, critical damping magnets 17, 18, movable stop 29 and its associated parts, and the stationary stop 25, do or may remain the same.

Reference will next be had to Figs. 14 to 18, wherein some applications of our invention to voltage regulation on direct current systems are shown. Referring first to Fig. 14, $G_1$ represents a direct current generator delivering power to load $L_1$ through mains $M_3$, $M_4$; $F_2$ the shunt field of said generator, $R_1$ the regulating rheostat in series with said field; $Y_1$ a relay having its forward stop and tongue connected in shunt around said rheostat as shown. This relay receives its exciting current from battery $X_1$ or other source of power in circuit with the fixed and movable contacts 25 and 29 of our regulating relay which is shown as the form illustrated in Figs. 4 and 5, though it may be of the type shown in Figs. 7 and 8. This statement relative to the regulating relay is true of each of the cases shown in the following figures of the drawings. The voltage coil 41 is excited from mains $M_3$, $M_4$, through suitable resistance $r_1$, while the current coil 42 is excited from the ammeter shunt $r_2$. The operation in this case is exactly the same as in the case illustrated in Fig. 9, except that the coercive force to move the relay disk is effected by permanent magnets acting on movable coils. When voltage is applied to the coil 41, a balance is obtained for a given adjustment of the retardation spring 21 when the voltage is a predetermined amount. When it exceeds this, the relay contacts 29, 25, are closed, the relay $Y_1$ breaks the shunt around the rheostat $R_1$ and the voltage of the generator $G_1$ thereby becomes reduced. When this voltage falls, the torsional spring again sends the disk $1_1$ in an anti-clockwise direction, thereby severing the contacts 25, 29. The relay $Y_1$ then releases its tongue, which, under the action of spring $y_1$, engages its forward stop and again completes the shunt around the rheostat $R_1$. The voltage then builds up again. These operations are thus repeated as the disk $1_1$ vibrates back and forth, not due to inertia, or to any of the forces inherent in the moving parts, but only to the electrical forces of the system. The current coil acts in opposition to the voltage coil, thus assisting the spring 21 and thereby effecting compensation as fully described with relation to Fig. 9.

In Fig. 15, the action of our regulating relay is identical with that above described. In this case, however, we have shown different means controlled by the relay for regulating the generator voltage. Here the generator $G_1$ is self excited, but included in its field circuit, in series with rheostat $R_1$, is a small series generator $G_2$ suitably driven, the field $F_3$ of which is connected to be short circuited by the relay $Y_1$ as shown. The generator $G_2$ is connected to oppose the voltage of generator $G_1$ and thereby opposes the flow of current in its field. Therefore when relay contacts 25 and 29 come together and the relay $Y_1$ is caused thereby to break the short circuit around the field $F_3$, the generator $G_2$ delivers its maximum opposition to the generator $G_1$ and lowers its voltage correspondingly. When, however, the contacts 25 and 29 separate, the relay $Y_1$ again completes the short circuit around the field of the generator $G_2$ thus reducing its voltage to zero. It then gives zero opposition to the generator $G_1$, whereupon the voltage of the latter will rise.

In Fig. 16, the arrangement, so far as the disk relay and its connections are concerned, is the same as in Fig. 15. In Fig. 16, however, the generator $G_2$ is replaced by a generator $G_3$, the fields of which are excited by two opposing windings $F_4$, $F_5$, in series respectively with two unequal resistances $r_3$ and $r_4$, the said field coils and resistances being connected in shunt with the generator $G_1$ as shown. Also in Fig. 16, a relay $Y_2$ having two active tongue contacts connected as shown to points between the field coils $F_4$ and $F_5$ and the resistances $r_3$ and $r_4$ replaces the single contact relay $Y_1$ of the former figures. The operation of the relay $Y_2$ by the disk contact is identically the same in this instance as in those hitherto described. When, therefore, the tongue of the relay $Y_2$ engages one of its contacts, this short circuits one of the resistances $r_3$, $r_4$, and the field of the generator $G_3$ is excited a determinate amount and of polarity depending upon which of the contacts is engaged, and when the relay tongue engages the other of its contacts, the generator field will tend to be excited in a different direction. In other words, when the voltage on the line rises beyond a predetermined amount, the disk 1 rotates anti-clockwise and brings contacts 25 and 29 together. This completes circuit of battery $X_1$ and causes the relay $Y_2$ to draw its tongue against spring $y_2$ into engagement with its lower contact, this short circuits resistance $r_3$ allowing more current to pass through field winding $F_4$ than through $F_3$. In this instance, the excitation of generator $G_3$ is increased, and since it opposes the excitation of the field of the generator $G_1$, the voltage of the latter will be diminished. The voltage of the generator $G_1$ thus falling, the disk $1_1$ of the disk relay will rotate clockwise thus breaking the exciting circuit of relay $Y_2$ at contacts 25 and 29. The tongue of the relay $Y_2$ will then be drawn by spring $y_2$ to the upper contact, thus short circuiting resistance $r_4$. In this case, the field excitation of generator $G_3$ is diminished and its opposition to generator $G_1$ thereby also diminished whereupon the voltage again builds up.

In Fig. 17, the regulation is effected by controlling a booster $G_4$ having a series field $F_6$ and shunt field $F_7$, which oppose each other the latter in series with a resistance $r_5$ which is connected to the tongue and back stop contact of relay $Y_3$ so as to be short circuited when said tongue engages said contact. Obviously, as the relay $Y_3$ makes and breaks the shunt circuit around resistance $r_5$, due to the controlling action of the disk relay responding to a rise and fall in the voltage of the generator $G_1$, the field excitation of the generator $G_4$ will vary accordingly and will oppose the generator $G_1$ when the resistance $r_5$ is short circuited due to a rise in voltage of generator $G_1$, and when the said short circuit is removed due to a drop in said voltage, the opposition of generator $G_4$, will be lessened and the voltage of generator $G_1$ will rise. The connections of the disk relay to the line are identical with those shown in Figs. 14, 15 and 16.

In the arrangement shown in Fig. 18, the regulating generators of the previous arrangements are supplanted by the generator $G_5$, having a shunt field $F_8$ connected across a Wheatstone bridge, having resistances $r_6$, $r_7$, $r_8$ and $r_9$—$r_{10}$ connected as shown. The resistances $r_9$, $r_{10}$, are in the same arm of the bridge and one of these, the resistance $r_{10}$, is adapted to be short circuited by the relay $Y_4$ when the controlling disk relay closes contacts 25 and 29. Therefore, when the voltage on the line rises beyond a predetermined amount, the disk $1_1$ will close contacts 25 and 29, thus completing circuit of relay $Y_4$ which will cause it to complete the short circuit around resistance $r_{10}$. Current will then flow to the generator fields $F_8$ in the direction of the arrow along the bottom conductor. This will so excite the generator $G_5$ as to cause it to oppose the voltage of the generator $G_1$, whereupon the voltage in the main line will drop, and the disk $1_1$ rotate anti-clockwise, breaking the circuit of relay $Y_4$ at contacts 25 and 29. The effect of this is to cause the relay $Y_4$ to sever the short circuit around resistance $r_{10}$, when current will pass to generator field $F_8$ in a reverse direction, thus causing generator $G_5$ to boost the voltage of generator $G_1$. These operations are repeated at intervals.

Various modifications may be made in addition to those herein specifically pointed out, without departing from the spirit of our invention, and we do not wish to be understood as limiting our invention to the specific details herein shown.

What we claim is:—

A controlling device for use in regulating an electric circuit, comprising, in combination, an angularly movable rigid body, means including magnetic fields for causing the movement of said body in accordance with a predetermined relation dependent upon the magnitude but independent of the phase relation of the current and voltage elements to be regulated, the direction of motion of said body being at right angles to the controlling magnetic field, and means controlled directly by said device for maintaining the current and voltage relation of said circuit accordingly.

In testimony whereof we affix our signatures in presence of two witnesses.

PIERRE O. KEILHOLTZ.
FORREST E. RICKETTS.

Witnesses:
ROBT. W. PEACH,
H. M. BURRISS.